(12) United States Patent
Huang et al.

(10) Patent No.: US 10,962,875 B2
(45) Date of Patent: *Mar. 30, 2021

(54) METHOD OF MASK SIMULATION MODEL FOR OPC AND MASK MAKING

(71) Applicant: Taiwan Semiconductor Manufacturing Co., Ltd., Hsin-Chu (TW)

(72) Inventors: Hsu-Ting Huang, Hsinchu (TW); Chih-Shiang Chou, Taoyuan County (TW); Ru-Gun Liu, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,336

(22) Filed: Dec. 2, 2019

(65) Prior Publication Data

US 2020/0103747 A1 Apr. 2, 2020

Related U.S. Application Data

(63) Continuation of application No. 15/813,774, filed on Nov. 15, 2017, now Pat. No. 10,495,967.
(Continued)

(51) Int. Cl.
*G03F 1/36* (2012.01)
*G03F 1/80* (2012.01)
(Continued)

(52) U.S. Cl.
CPC .............. *G03F 1/36* (2013.01); *G03F 1/78* (2013.01); *G03F 1/80* (2013.01); *G03F 7/16* (2013.01);
(Continued)

(58) Field of Classification Search
CPC ..... G03F 1/36; G03F 1/80; G03F 1/78; G03F 7/20; G03F 7/38; G03F 7/26; G03F 7/16; H01L 21/0277; H01L 22/20
(Continued)

(56) References Cited

U.S. PATENT DOCUMENTS 7,297,453 B2 11/2007 Watson et al.
7,703,069 B1 4/2010 Liu et al.
(Continued)

FOREIGN PATENT DOCUMENTS

CN 106462086 2/2017
TW 201346436 11/2016
(Continued)

*Primary Examiner* — Sun J Lin
(74) *Attorney, Agent, or Firm* — Haynes and Boone, LLP (57) ABSTRACT

An integrated circuit (IC) method is provided. The method includes building a mask model to simulate an aerial mask image of a mask, and a compound lithography computational (CLC) model to simulate a wafer pattern; calibrating the mask model using a measured aerial mask image of the mask; calibrating the CLC model using measured wafer data and the calibrated mask model; performing an optical proximity correction (OPC) process to a mask pattern using the calibrated CLC model, thereby generating a corrected mask pattern for mask fabrication. Alternatively, the method includes measuring a mask image of a mask optically projected on a wafer with an instrument; calibrating a mask model using the measured mask image; calibrating a CLC model using measured wafer data and the calibrated mask model; and performing an OPC process to a mask pattern using the calibrated CLC model, thereby generating a corrected mask pattern for mask fabrication.

20 Claims, 7 Drawing Sheets

US 10,962,875 B2
Page 2

Related U.S. Application Data (60) Provisional application No. 62/564,812, filed on Sep. 28, 2017.

(51) Int. Cl.

| | | |
|---|---|---|
| *G03F 7/16* | (2006.01) | |
| *G03F 7/20* | (2006.01) | |
| *G03F 7/38* | (2006.01) | |
| *G03F 7/26* | (2006.01) | |
| *G03F 1/78* | (2012.01) | |
| *H01L 21/027* | (2006.01) | |
| *H01L 21/66* | (2006.01) | |
| *G06F 30/20* | (2020.01) | |
| *G06F 30/398* | (2020.01) | |
| *G06F 119/18* | (2020.01) | |

(52) U.S. Cl.
CPC ............... *G03F 7/20* (2013.01); *G03F 7/26* (2013.01); *G03F 7/38* (2013.01); *G06F 30/20* (2020.01); *G06F 30/398* (2020.01); *H01L 21/0277* (2013.01); *H01L 22/20* (2013.01); *G06F 2119/18* (2020.01)

(58) Field of Classification Search
USPC ....................................................... 716/50, 53
See application file for complete search history.

(56) References Cited

U.S. PATENT DOCUMENTS

| | | | |
|---|---|---|---|
| 8,122,385 | B2 | 2/2012 | Fukuhara et al. |
| 8,589,829 | B2 | 11/2013 | Liu et al. |
| 8,719,739 | B2 | 5/2014 | Fujimura et al. |
| 8,762,900 | B2 | 6/2014 | Shin et al. |
| 8,796,666 | B1 | 8/2014 | Huang et al. |
| 8,812,999 | B2 | 8/2014 | Liu et al. |
| 8,850,366 | B2 | 9/2014 | Liu et al. |
| 8,874,423 | B2 | 10/2014 | Cao et al. |
| 8,906,595 | B2 | 12/2014 | Liu et al. |
| 8,954,899 | B2 | 2/2015 | Wu et al. |
| 9,093,530 | B2 | 7/2015 | Huang et al. |
| 9,367,655 | B2 | 6/2016 | Shih et al. |
| 9,390,217 | B2 | 7/2016 | Wang et al. |
| 9,465,906 | B2 | 10/2016 | Chang |
| 9,548,303 | B2 | 1/2017 | Lee et al. |
| 10,495,967 | B2 * | 12/2019 | Huang et al. ........... H01L 22/20 |
| 2017/0004242 | A1 | 1/2017 | Chang et al. |
| 2017/0053056 | A1 | 2/2017 | Huang et al. |

FOREIGN PATENT DOCUMENTS

| | | |
|---|---|---|
| TW | 201708932 | 3/2017 |
| TW | 201729008 | 8/2017 |

* cited by examiner

METHOD OF MASK SIMULATION MODEL FOR OPC AND MASK MAKING

This application is a continuation application of U.S. patent application Ser. No. 15/813,774, filed Nov. 15, 2017, now issued as U.S. Pat. No. 10,495,967, which is non-provisional application of and claims the benefit of U.S. Provisional Patent Application Ser. No. 62/564,812 filed Sep. 28, 2017. The entire disclosures of these applications are hereby incorporated by reference.

BACKGROUND

The integrated circuit (IC) design is more challenging when semiconductor technologies are continually progressing to smaller feature sizes, such as 32 nanometers, 28 nanometers, 20 nanometers, and below. The performance of a designed circuit is seriously influenced by the imaging of various circuit patterns, such as doped wells, source and drains, gate electrodes, vias/contacts and other circuit features. When advanced circuit design has three dimensional structures with fin-like active regions, it is more difficult to form circuit features with proper shapes and sizes. To enhance the imaging effect when a design pattern is transferred to a wafer, optical proximity correction (OPC) is indispensable. The design pattern is adjusted to generate an image on the wafer with improved printability. However, the final wafer result is associated with various processes and factors. The lithography printing capability is limited by resist blur, mask diffraction, projection imaging resolution, electron beam blur of mask writing, resist, etch and/or other factors. The existing method is not effective to provide optimized wafer results in terms of circuit performance and fabrication cost. Especially, the mask diffraction is not isolated from other factors during certain steps of the simulation, such as calibration.

Therefore, what is needed is a method for mask simulation and mask making to effectively reduce patterning errors and address the above issues.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Figure 1:
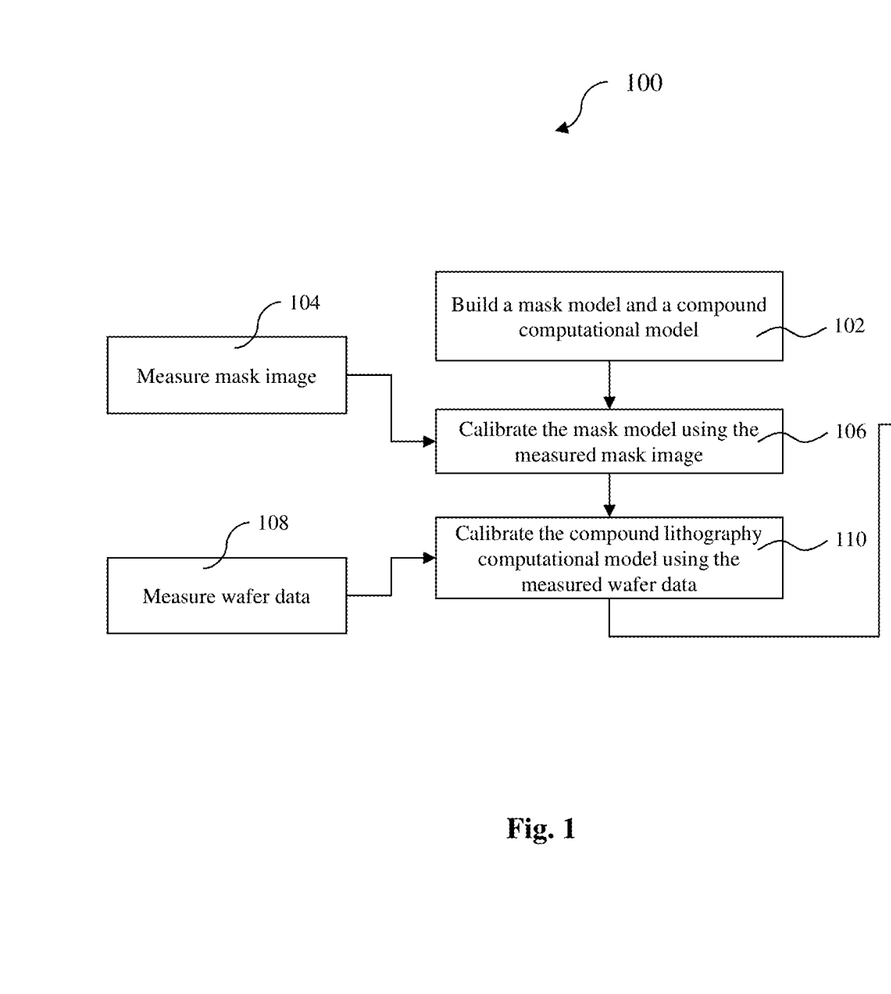
FIG. 1 is a flowchart of a method for making an integrated circuit (IC), constructed in accordance with some embodiments.

FIG. 1 is a flowchart of a method 100 for making an integrated circuit (IC), particularly optical proximity correction (OPC) process to IC design, mask making and wafer patterning, constructed in accordance with some embodiments.

The method 100 begins at operation 102 by building a mask model and a compound lithography computational (CLC) model. The models are built using the historic data from both the mask making process and the wafer making process. Particularly, the mask model is built to simulate a mask image on a semiconductor substrate (such as a wafer, silicon wafer or other suitable semiconductor wafer) during a lithography process to pattern the semiconductor substrate. Specifically, the mask model considers two factors: mask diffraction and imaging projection of the corresponding lithography system. During a lithography process, a circuit pattern defined on the mask is projected to a photoresist (or simply resist) layer coated on the semiconductor substrate. The mask pattern will cause diffraction of the light from the light source of the lithography system and the light is further projected through projection lens of the lithography system to form an image of the mask pattern on the wafer surface (or the coated resist layer). The image of the mask pattern, or simply the mask image, is determined by the mask diffraction and imaging projection. The building of the mask model is based on theoretical analysis (such as optical imaging analysis and formulation), engineering input and historic manufacturing data, such as the data from the aerial image (may be collected from IMS). For example, the coefficients or other parameters in the mathematical model are determined using the historic manufacturing data (such as using least square fit). In some embodiments, the mask model is defined from total intensity from the partially coherent illumination source as:

$$I_\alpha(x, mp) = \sum_{\beta,\gamma} \int\int d^2 f^i I^i_\gamma(f^i) \int\int d^2 f'' \int\int d^2 f' \tilde{P}^*_{\alpha\beta}(f'')\tilde{T}^*_{\beta\gamma}(f'', f^i, mp)$$

$$\tilde{P}_{\alpha\beta}(f')\tilde{T}_{\beta\gamma}(f', f^i, mp)\exp(i(f'-f'')\cdot x))$$

where x is image position, mp is a set of mask model parameters, $\alpha$, $\beta$, and $\gamma$ are the polarization states, $I^i_\gamma(f^i)$ is the intensity of the illumination light at wave vector $$f^i = \frac{1}{2\pi}(k_x \hat{x} + k_y \hat{y}),$$

f' and f'' are the wavevectors on the pupil plane,
$\tilde{P}_{\alpha\beta}$ is the lens pupil function, and $\tilde{T}_{\beta\gamma}$ is the mask diffraction from the EMF simulation of the mask profile, and
$I_{tot}$ is the light intensity at location x and defines the image of the mask.

In some embodiments, the mask model takes a kernel convolution approach defined as below $$I_\alpha(x, y, mp) = \sum_i \left| \sum_\gamma m_\gamma(x, y) \otimes V_{\alpha\gamma,i}(x, y, mp) \right|^2$$

where
$I_\alpha(x, y, mp)$ is the diffracted mask image,
$m_\gamma(x, y)$ is a function modified from real mask layout,
$V_{\alpha\gamma,i}(x, y, mp)$ is the kernel, and
mp is a set of mask model parameters.

In operation 102, the CLC model is constructed in mathematical formula to simulate a wafer contour of an IC pattern when formed on the semiconductor wafer through a lithography process and additionally including an etching process. Collectively, when an IC pattern defined on the mask is transferred to a resist layer coated on the semiconductor substrate, the contour of the pattern resist layer is related to factors including mask diffraction, imaging projection, resist reaction with phone and resist development. If the wafer contour refers to the contour of the pattern transferred to a material layer of the semiconductor substrate by etching, then it is further related to the corresponding etching process. The building of the CLC model is based on theoretical analysis (such as resist reaction with light, resist development and etching in addition to optical imaging analysis and formulation), engineering input and historic manufacturing data, such as the data from the lithography process and the etching process. For example, the coefficients or other parameters in the mathematical model are determined using the historic manufacturing data (such as using least square fit). A proper procedure may be implemented to effectively build the CLC model. In some embodiments, the CLC model is built through a procedure that includes, constructing a single mathematical model that is able to collectively simulate the lithography exposure process, resist development and the etching process; and determining the coefficients or other parameters in the mathematical model using the historic data (such as by least square fit). The single mathematical model may be constructed according to various inputs, such as, theoretical analysis of the above processes, resist reaction to the photons and resist development, empirical formula, and engineer inputs. The CLC model may be defined by a formula as $$W(x) = \Phi_2 \Phi_1 (I(x, mp)))$$

wherein $W(x)$ defines a simulated wafer contour, or a pattern transferred to the semiconductor substrate by a lithography process and an etching process. The bold x represents a location in a 2-D Cartesian coordinate; $\Phi_1$ defines a resist pattern function that simulates characteristics of a photoresist coated on the semiconductor wafer; and $\Phi_2$ defines a wafer pattern function that simulates characteristics of a corresponding etching process applied to the semiconductor wafer.

The method 100 also includes an operation 104 to collect or measure one or more mask images for calibration of the mask model. The measurement of the mask image may be implemented in a lithography exposure system or an image measurement system (IMS), both will be described later.

The IMS system can be similar to the lithography exposure system in the image of the mask pattern is considered. In the operation 104, the mask image(s) may be collected from one or more test mask, one or more production mask or a combination thereof.

Figure 14:
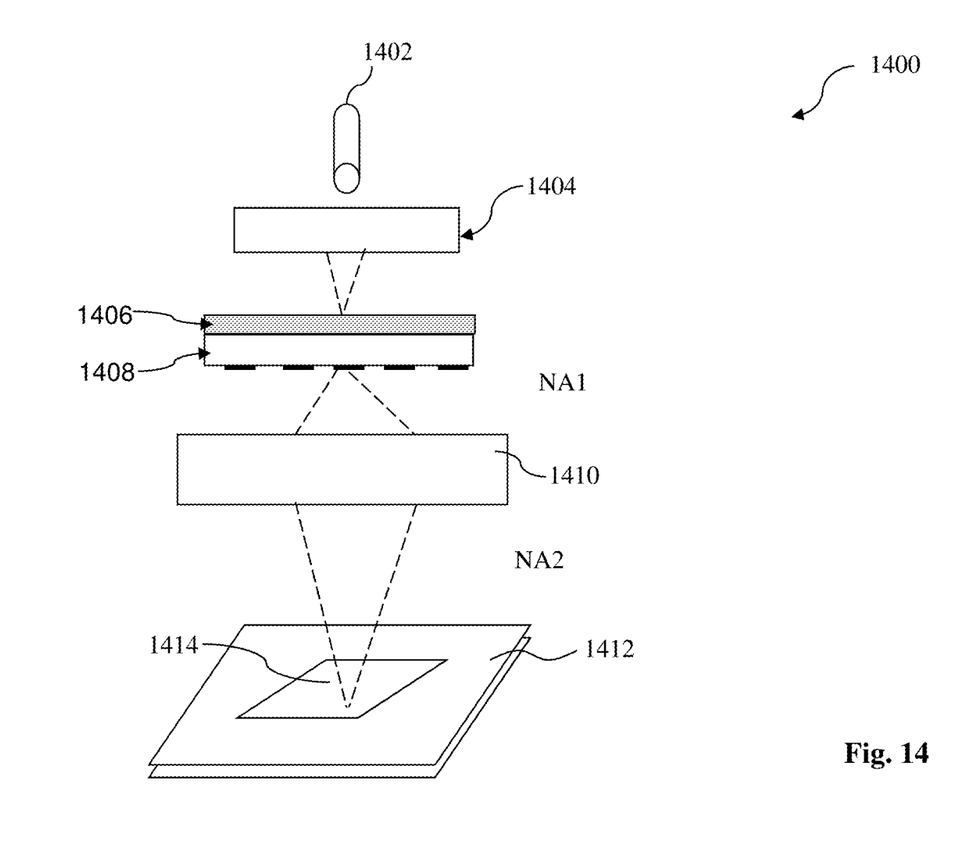
FIG. 14 is a schematic view of an image measurement system (IMS), constructed in accordance with some embodiments.

In some embodiment, the IMS is a system similar to a lithography system with reduced cost and different configuration and design. Illustrated in FIG. 14 is a schematic view of an IMS system 1400, in accordance with some embodiments. The IMS system 1400 is operable to generate mask images similar to or the same as that of a lithography system. For example, the IMS system may use a radiation source with different wavelength for amplified mask images for better measurement and analysis. In at least some of the present embodiments, the IMS system 1400 includes a radiation source 1402, an illuminator 1404, a mask stage 1406 configured to secure a mask 1408, projection optics 1410, and an image stage 1412 designed to receive the image of the mask. For example, the system 1400 may include image detector 1414 configured there to measure the mask image and collect the data from the mask image. A general description of the operation of the IMS system 1400 may be given as follows: a radiation (such as ultraviolet light) from the radiation source 1402 is directed toward the illuminator 1404 and projected onto the mask 1408. A mask image is directed toward the projection optics 1410, which focuses the light and projects the light onto the image stage 1412 so that the mask image is measured or collected by the image detector 1414 to mimic a mask image on a resist layer of a wafer by a lithography system. Additionally, in various examples, each subsystem of the IMS system 1400 may be housed in a chamber to reduce environment interference.

In the embodiments described herein, the radiation source 1402 may be used to generate the EUV light. In some embodiments, the radiation source 1402 may be an ultraviolet (UV), deep UV, extreme UV or other suitable light, such as light with long wavelength. As described above, light from the radiation source 1402 is directed toward the illuminator 1404. In some embodiments, the illuminator 1404 may include optical image components, such as lens in order to direct light from the radiation source 1402 onto the mask stage 1406, and particularly to the mask 1408 secured on the mask stage 1406. In some examples, the illuminator 1404 may be configured to shape the light passing through in accordance with a particular pupil shape, and including for example, a dipole shape, a quadrupole shape, an annular shape, a single beam shape, a multiple beam shape, and/or a combination thereof. In some embodiments, the illuminator 1404 is operable to configure the optical imaging components to provide a desired illumination to the mask 1408. In some embodiments, the illuminator 1404 is configured to provide an on-axis illumination (ONI) to the mask 1408. In some embodiments, the illuminator 1404 is configured to provide an off-axis illumination (OAI) to the mask 1408.

As discussed above, the IMS system 1400 also includes the mask stage 1406 configured to secure the mask 1408. The light is directed from the mask 1408 and is further directed towards the projection optics 1410, which collects the light from the mask 1408. By way of example, the light collected by the projection optics 1410 carries an image of the pattern defined by the mask 1408. In various embodiments, the projection optics 1410 provides for imaging the pattern of the mask 1408 onto the image stage 1412. In particular, in various embodiments, the projection optics 1410 focuses the collected light and projects the light onto the image detector 1414.

In certain embodiments, the illuminator 1404 mimics the illumination configurations in a lithography system, and the numerical aperture NA1 is the same as the numerical aperture of the entrance pupil in the real projection lithography system. In certain embodiments, the numerical aperture NA2 is very small so the mask image is magnified and can be measured by the image detector 1414, such as charge-coupled device (CCD) or other suitable image detector.

The IMS system 1400 may include other components and may have other alternatives. In some embodiments, the IMS system 1400 may include a pupil phase modulator to modulate an optical phase of the EUV light directed from the mask 1408, such that the light has a phase distribution along a projection pupil plane. In some embodiments, the pupil phase modulator utilizes a pupil filter placed on the projection pupil plane. By way of example, the pupil filter may be employed to filter out specific spatial frequency components of the light from the mask 1408. In some embodiments, the pupil filter may serve as a phase pupil filter that modulates the phase distribution of the light directed through the projection optics 1410.

The method 100 also includes an operation 106 to calibrate the mask model using the measured mask image from the operation 104. As noted above, the mask model is designed to simulate the mask image. Initially, the parameters in the mask model are to be determined by the historic manufacturing data. Further, over time, the lithography system and the mask pattern may have drifting or other variation, causing the mask model less effective and accurate. So the mask model needs to be calibrated to catch the drifting or other variation over time. In the disclosed method, the calibration is based on the measured mask image instead of simulation data. In the existing method, the calibration of the mask model is based on the simulation data, which need to be rigorous electromagnetic (EM) wave simulation data, including refractive indices, film thicknesses, and pattern sidewall angle. However, mask diffraction model accuracy and its flexibility are challenging. The data from the measured mask image(s) collectively and properly include all the above but isolated from other irrelevant factors, such as resist development. The measurement of the mask image may be implemented in a lithography exposure system or an image measurement system (IMS), both will be described later. The IMS system can be similar to the lithography exposure system in the image of the mask pattern is considered. In the operation 104, the mask image(s) may be collected from one or more test mask, one or more production mask or a combination thereof.

In the operation 106, the calibration may be implemented through a procedure including mathematical calculation. In the present embodiment, the mask model is calibrated by comparing a difference between the measure mask image and the simulated mask image, and minimizing the difference by tuning the parameter in the mask model. The minimization formula for the calibration is defined below $$\min_{mp} \sum_{i} \|I_{s,\alpha,i}(x, mp) - I_{m,\alpha,i}(x, mp)\|$$

wherein $I_{m,\alpha}(x, mp)$ is the measured mask image and $I_{s,\alpha}(x, mp)$ is the simulated mask image.

Alternative embodiments may use gauges for the optimization process, such as measured mask contours.

The method 100 may also include an operation 108 to collect or measure the wafer data, such as wafer contour of the pattern transferred from the mask to the semiconductor substrate through lithography exposure process, developing the exposed resist and etching process to etch a material layer of the semiconductor substrate using the pattern resist layer as an etch mask.

In some examples, the operation 108 may collect the historic data from the wafer making process, such as data from the lithography patterning process and the etching process, which are applied to pattern the semiconductor wafer. In furtherance of the examples, the data may be collected from the corresponding lithography tool and etch tool. The data may be further collected from the characteristics of the photoresist, critical dimension (CD) measurement from the patterned wafer.

The method 100 further includes an operation 110 to calibrate the CLC model using the measured wafer data from the operation 108. Note the CLC model includes the mask model and therefore the calibration of the CLC model also includes the inputs from above operations. The calibration of the CLC model may be implemented through a procedure including mathematical calculation. In the present embodiment, the CLC model is calibrated by comparing a difference between the measured CD and the simulated CD, and then minimizing the difference by tuning various parameters in the CLC model. Particularly, the minimization formula is defined as below $$\min_{p} \sum_{j} \|CD_{s,j}(p) - CD_{m,j}(p)\|$$

wherein
$CD_{m,j}$ is measured CD, $CD_{s,j}$ is the simulated CD, and the parameter p represents various parameters in the CLC model and may include wafer focus, scanner lens parameters, photoresist parameters, and etch process parameters. Alternative embodiments may use other gauges for the optimization process, such as measured wafer contour.

After the calibration of the mask model and the calibration of the CLC model, the CLC model can be used in an OPC process for mask pattern optimization and mask making, which is further described below.

Figure 2:
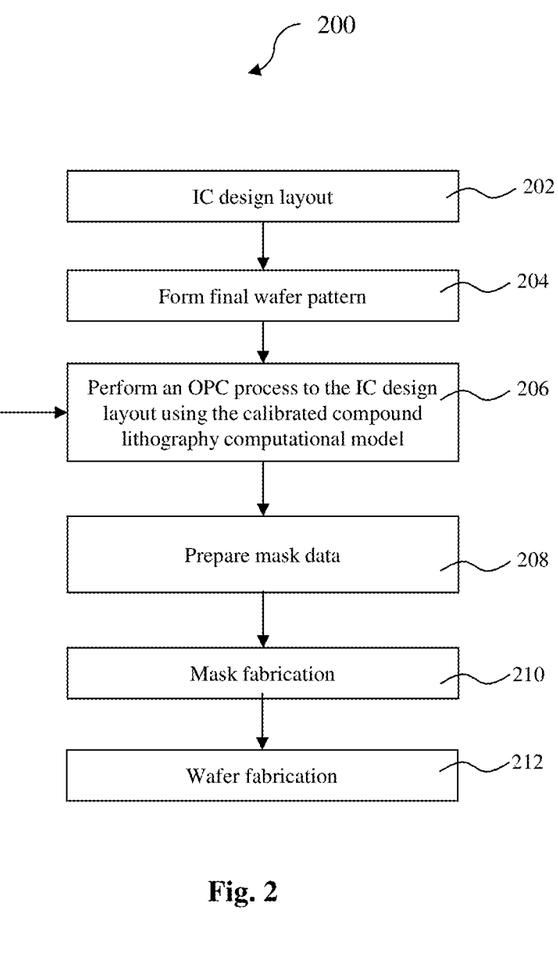
FIG. 2 is a flowchart of a method for making an integrated circuit (IC), constructed in accordance with some embodiments.

FIG. 2 is a flow chart of a method 200 for IC fabrication, constructed in accordance with some embodiments. The method 200 begins at operation 202 by receiving an IC design layout (or an IC design pattern) from a designer. In one example, the designer can be a design house. In another example, the designer is a design team separated from a semiconductor manufacturer that is capable of making IC products according to the IC design layout. In various embodiments, the semiconductor manufacturer is capable of making photomasks, semiconductor wafers, or both. The IC design layout includes one or more layers of circuit patterns designed for an IC product and based on the specification of the IC product. A photomask refers to a patterned substrate used in a lithography process to pattern a semiconductor wafer. In the following description, photomask, mask and reticle are used exchangeably.

The IC design layout is presented in one or more data files having the information of the circuit patterns. In one example, the IC design layout is expressed in a graphic data system (GDS or GDSII) format known in the art. In other examples, the IC design layout may be expressed in other proper format, such as open artwork system interchange standard (OASIS or OAS). The designer, based on the specification of the product to be manufactured, implements a proper design procedure to generate the IC design layout. The design procedure may include logic design, physical design, and/or place and route. As an example, a portion of the IC design layout includes various IC features (also referred to as main features), such as active region, doped wells, source and drain, gate electrode, vias/contacts and metal lines of the interlayer interconnection, and openings for bonding pads, to be formed in a semiconductor substrate (such as a silicon wafer) and various material layers disposed over the semiconductor substrate. The IC design layout may include certain assist features, such as those features for imaging effect, processing enhancement, and/or mask identification information.

Figure 3:
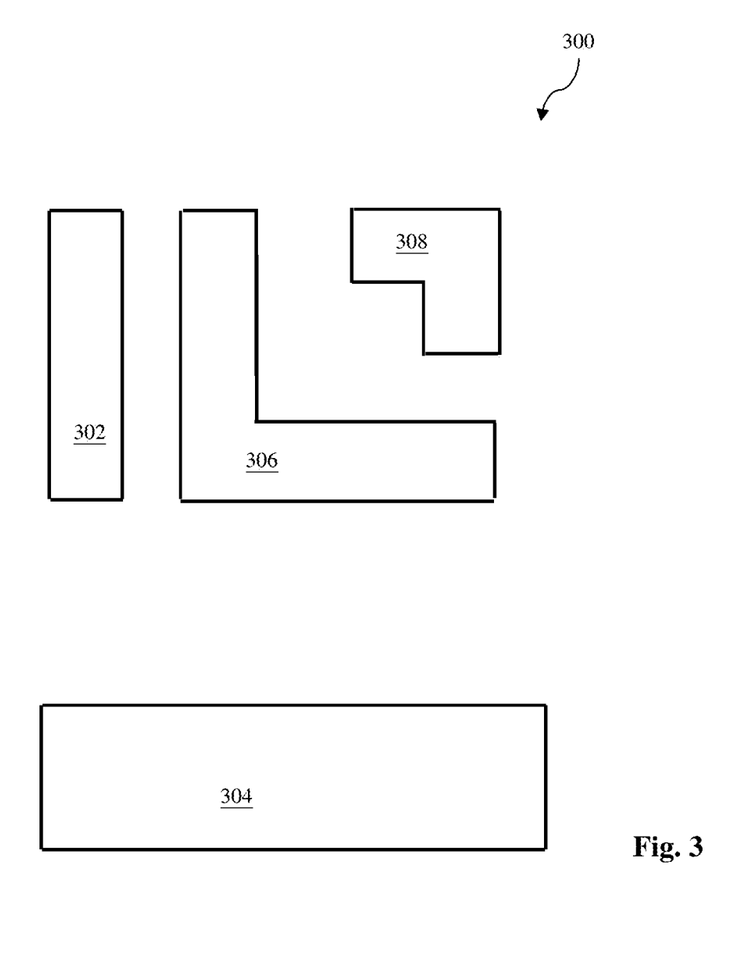
FIGS. 3 and 4 are schematic views of an IC design layout at various design stages, constructed in accordance with some embodiments.

FIG. 3 illustrates a schematic view of a design layout 300 in accordance with some embodiments. The IC design layout 300 includes a plurality of circuit features, such as exemplary circuit features 302, 304, 306 and 308. Those circuit features are also referred to as main features. The main features in the IC design layout 300 constitute a portion of the integrated circuit of the IC product and are to be formed or defined in one material layer of the semiconductor wafer. Therefore the IC design layout 300 defines a pattern layer of the IC product. In various examples, a pattern layer of the IC product includes a pattern that defines active regions, source/drains, gate electrodes, or contact features. In one embodiment, the IC design layout 300 is a pattern defining contact holes to be formed in a dielectric material layer of the semiconductor wafer.

Referring to FIG. 2, the method 200 may include an operation 204 by forming a wafer target pattern (or final wafer pattern or final wafer target pattern) from the IC design layout 300. In some embodiments, the operation 204 includes adding dummy features to the IC design layout 300 in order optimize the semiconductor fabrication. For example, the IC design layout 300 includes a pattern that defines various active regions to be formed on a semiconductor wafer. In furtherance of the examples, the active regions are formed on the semiconductor wafer by a procedure that includes lithography patterning to form an etch mask; etching to form trenches in the semiconductor wafer; filling a dielectric material in the trenches; and performing a chemical mechanical polishing (CMP) process to form shallow trench isolation (STI) features on the semiconductor wafer, thereby defining active regions surrounded by the STI features. The CMP process removes the excessive dielectric material and planarizes the top surface of the semiconductor wafer. However, the CMP process may also introduce dishing and erosion effects. The dummy features are added to the IC design layout to tune the pattern density, thereby reducing the side effects of the CMP process and improve the result of the CMP process. In another example, the IC design layout includes a pattern that defines active regions. The dummy features are inserted to the IC design layout such that a thermal annealing process (such as a thermal annealing process to activate the ion implanted dopant) applied to the semiconductor wafer is improved and the thermal annealing variation from location to location is reduced or eliminated. In another example, the IC design layout is a pattern that defines metal lines in the interconnection structure. The dummy features are added to the IC design layout in the die-corner-circuit-forbidden region for chip corner stress relief. In some other examples, the operation 204 may additionally or alternatively include adding other features, such as mask identification number (such as a barcode), alignment mark, and/or test pattern to the IC design layout in proper locations, such as in the frame region for various fabrication usages and considerations. The output of the operation 204 is the expected wafer pattern (final wafer pattern) or constrains (such as target point) to the expected wafer pattern.

Figure 4:
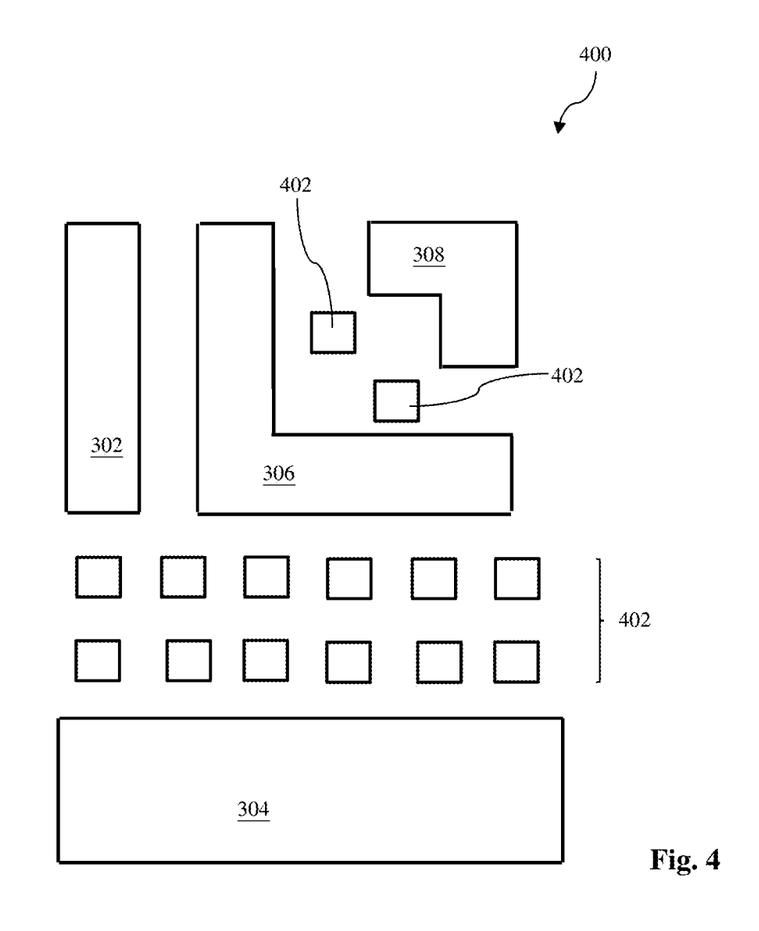
Figure 5:
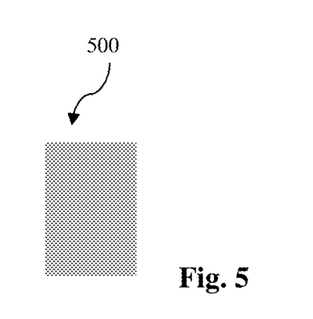
FIGS. 5, 6, 7 and 8 are schematic views of a main feature of an IC design layout at various design stages, constructed in accordance with some embodiments.
Figure 6:
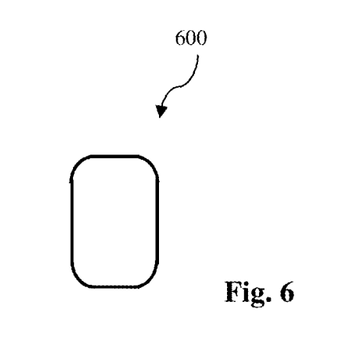

In one example for illustration, dummy features 400 are inserted into the IC design layout 300, thereby forming a final wafer pattern 400 as shown in FIG. 4. In the present example, the dummy features 402 are added to change the local pattern density such that the pattern density has less variation from location to location, thereby the processing variation and other unexpected effects are reduced or eliminated.

The method 200 includes an operation 206 by performing an OPC process to the IC design layout 300 using the CLC model from the operation 110, thereby generating a final mask pattern. The final mask pattern is the pattern to be formed on the photomask, which is further used to pattern a semiconductor wafer by a lithography process using the patterned photomask. If the operation 204 is present and forms a final wafer target pattern, the OPC process is applied to the final wafer target pattern, thereby generating the final mask pattern. If the wafer target is not formed in the operation 204, it can be formed in the operation 206 while performing the OPC process.

The OPC is performed to correct the image errors by modifying the IC design layout. The OPC process generates a mask pattern such that thus generated mask pattern is able to form a wafer pattern on the semiconductor wafer with a tolerable difference from the wafer target. In the present embodiments, the OPC process is model-based OPC using the CLC model. In alternative embodiments, the OPC process may additionally include rule-based OPC and table-based OPC combined with the model based OPC into a hybrid approach.

The OPC process includes moving edges of a main feature and adding assist features to the mask data. In various embodiments, the main feature is resized, repositioned, and/or reshaped. In another embodiment, various assist features, such as scattering bars, are added to the mask data. In still another embodiment, serifs or hammerheads are added to the mask data. The assist features may be placed a distance away from the main feature (such as scattering bars) or be placed adjacent to the main feature (such as serifs and hammerheads).

In another embodiment, the OPC process may be implemented in consideration of the environmental impact, such as those features approximate the main features. The environmental impact includes etching loading effect, the loading effect of the lithography patterning or the pattern density of a chemical mechanical polishing (CMP) process. Those environmental impacts may be included in the CLC model. In one example, the environment-induced-corner-rounding critical level may be defined by a model convolution and is incorporated in a CLC model. As noted above, the OPC process simulate the wafer making process that includes the imaging effect of the lithography exposing process, responses of the photoresist layer to the light radiation during the lithography exposing and to the developing solution during the developing process, and an etching process to transfer the pattern from the photoresist layer to the underlying material layer of the semiconductor substrate.

During the OPC process using the CLC model, a main feature is adjusted as described above (adding assist features, resizing, repositioning and/or reshaping), then the modified mask data is simulated by the OPC model, thereby generating a simulated wafer contour. The simulated contour is further compared with the wafer target to evaluate if the modified mask data is acceptable. The evaluation is implemented by a proper procedure, such as edge placement error, or area difference. In one particular example, various target points are assigned to the wafer target. When the simulated wafer contours are within a tolerable distance from the target points, it is considered that the modified mask data is acceptable. Thus modified mask data becomes the desired mask pattern (also referred to as OPCed mask pattern). When the desired mask pattern is formed on the mask, the corresponding wafer pattern is substantially similar to the final wafer target or with a difference less than an acceptable range.

The OPC process is further illustrated in FIGS. 5 through 8 with an exemplary main feature 500. Note that the main feature illustrated in FIG. 5 only serve as an exemplary feature for simplicity. In a particular example, the main feature 500 is a rectangle that defines a contact hole to be formed on a semiconductor substrate. In other examples, the main feature 500 may include a polygon (or trapezoid) or any other suitable shape.

Figure 7:
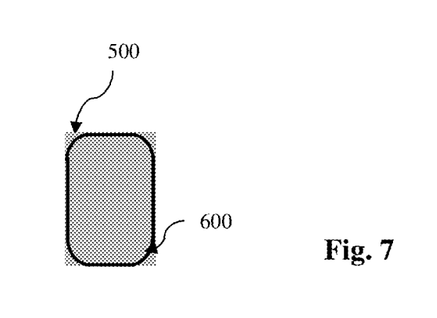
Figure 8:
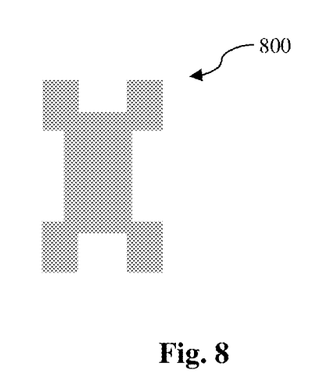
Figure 11:
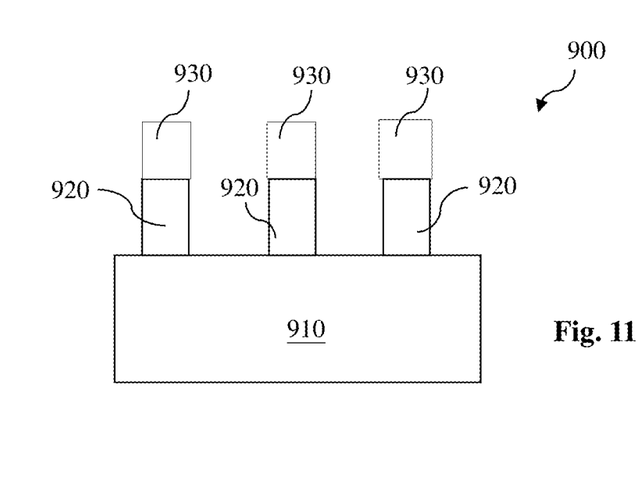

During the subsequent simulations, the simulated contour is compared with a wafer target to determine the difference. In some embodiments, the original mask layout of main features 500 is used as the wafer target. However, the wafer target may be chosen differently, such as wafer target 600 in FIG. 6, for better iterative simulation convergence without degradation to the wafer pattern. During the iterative simulations, the simulated contour is compared to the wafer target to determine the difference, as illustrated in FIG. 7. FIG. 11 illustrates a desired mask pattern 800 of the main feature 500 generated by the operation 206 in accordance with some embodiments.

Back to the method 200, by implementing the OPC process using the CLC model at the operation 206, the mask pattern is generated. The advantages of the approach include reduced error according to various embodiments. The error is the difference between real wafer pattern and expected wafer pattern. In the disclosed method, mask model is calibrated using the measured mask image instead of using a simulated mask image, the calibration is more accurate and effective.

Referring back to FIG. 2, the method 200 may further include an operation 208 by preparing the mask data, such as fracturing the mask pattern and generating the corresponding electron-beam shot map. In some embodiments, the operation 208 includes mask data preparation to generate the electron-beam shot map. The mask data preparation includes fracturing the mask pattern into polygons or other suitable shapes, and further includes defining dose for each polygon in some examples. In some examples where the final mask data generated from the operation 206 is already defined in the electron-beam shot map, the operation 208 may be skipped.

Still referring to FIG. 2, the method 200 may also include an operation 110 for mask making. In the present embodiments, an e-beam or a mechanism of multiple e-beams is used to form a pattern on the mask based on the electron-beam shot map. The mask can be designed in various suitable technologies. In one embodiment, the mask is designed to have a binary pattern. In this case, the mask pattern includes opaque regions and transparent regions. The radiation beam (e.g. ultraviolet or UV beam), used to expose the image sensitive material layer (such as photoresist) coated on a wafer, is blocked by the opaque region and transmits through the transparent regions. In one example, the binary mask includes a transparent substrate (e.g., fused quartz), and an opaque material (e.g., chromium) coated in the opaque regions of the mask. In another embodiment, the mask is designed to have phase shift. In the phase shift mask (PSM), various features in the pattern formed on the mask are configured to have proper phase difference to enhance the resolution and imaging quality. In various examples, the PSM can be an attenuated PSM or an alternating PSM known in the art. In some other embodiments, the mask is an extreme ultraviolet (EUV) mask having a reflective pattern. In one example, the EUV mask includes a substrate with a suitable material, such as a low thermal expansion material (LTEM). In various examples, the LTEM includes fused quartz, $TiO_2$ doped $SiO_2$, or other suitable materials with low thermal expansion. The EUV mask includes a reflective multiple layers (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configurable to highly reflect the EUV light. The EUV mask may further include a capping layer, such as ruthenium (Ru), disposed on the ML for protection. The EUV mask further includes an absorption layer, such as a tantalum boron nitride (TaBN) layer, deposited over the ML. The absorption layer is patterned to define a layer of an integrated circuit (IC). Alternatively, another reflective layer may be deposited over the ML and is patterned to define a layer of an integrated circuit, thereby forming a EUV phase shift mask.

During the mask making process, a resist layer sensitive to the electron-beam is coated on the mask, the resist layer is exposed using the electron-beam in an electron-beam lithography system according to the electron-beam shot map. The resist layer is further developed to form a patterned resist layer. An etching process is further applied to a material layer (such as the absorption layer) through the openings of the patterned resist layer, thereby transferring the pattern defined in the patterned resist layer to the material layer. The resist layer is removed thereafter by wet stripping, plasma ashing or both.

Figure 9:
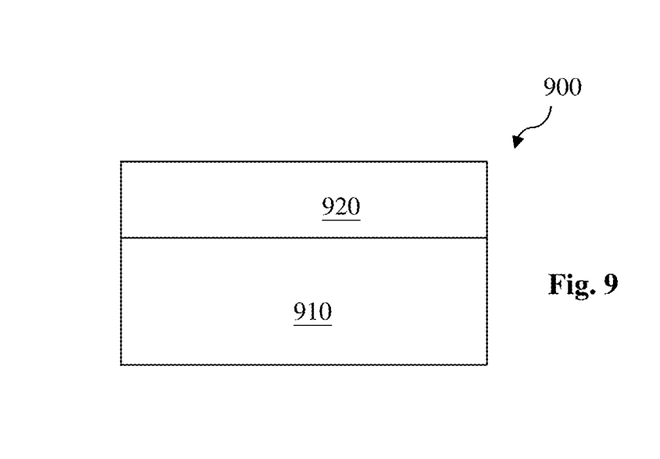
FIGS. 9, 10, 11 and 12 are sectional views of a semiconductor wafer at various fabrication stages, constructed in accordance with some embodiments.

In some embodiments, the method 200 may include an operation 212 for wafer making. Illustrated in FIG. 9 is a sectional view of a semiconductor wafer 900 in accordance with some embodiments. The semiconductor wafer 900 is fabricated using a mask or a set of masks formed by the above method. The semiconductor wafer 900 includes a semiconductor substrate 910, such as a silicon substrate or a substrate additionally or alternatively having some other semiconductor material, such as germanium, silicon germanium, silicon carbide, gallium arsenide. The semiconductor wafer 900 may further include various doped regions, dielectric features, and multilevel interconnects (or are formed at subsequent manufacturing steps). The semiconductor wafer 900 may further include a material layer 920 to be patterned. The material layer 920 includes a dielectric layer or a conductive layer in some embodiments. The material layer 920 may include a semiconductor material layer or is a top portion of the semiconductor substrate in some embodiments. The semiconductor wafer 900 includes a silicon substrate or other proper substrate and material layers formed thereon.

Figure 10:
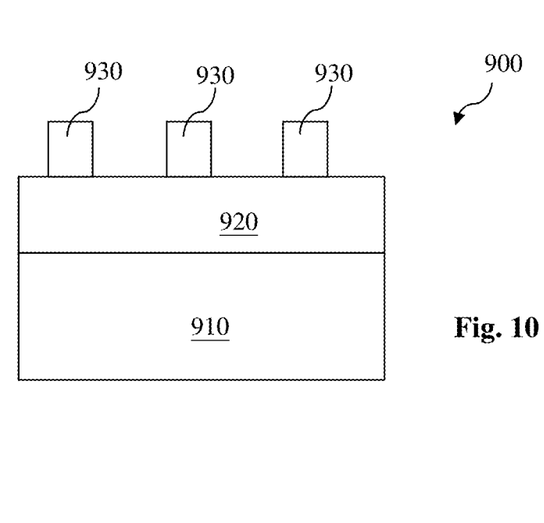
Figure 12:
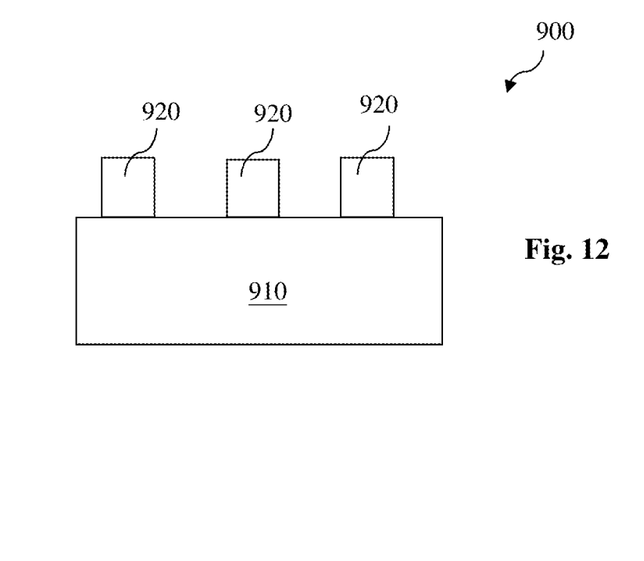

The wafer making process includes a lithography patterning process. In some examples, the lithography patterning process includes photoresist coating, lithography exposing process, PEB, and developing. The lithography patterning process forms a patterned photoresist layer 930 on the semiconductor wafer 900, as illustrated in FIG. 10. Particularly, the lithography exposing process is implemented in a lithography system using the mask fabricated by the operation 210. The wafer making process further includes other steps to transfer the pattern defined in the patterned photoresist layer 930 to the underlying material layer 920. In one example, the wafer making process includes an ion implantation process to form various doped regions in the semiconductor wafer using the patterned photoresist layer as an implantation mask. In another example, the wafer making process includes an etching process to etch the underlying material layer 920 using the patterned photoresist layer as an etch mask, as illustrated in FIG. 11. After the etching process (or the ion implantation process), the patterned resist layer may be removed by wet stripping or plasma ashing, as illustrated in FIG. 12.

Other embodiments and modifications may be implemented without departing from the spirit of the present disclosure. The present disclosure provides a method for generating a mask pattern according to an IC design layout. Particularly, the method includes an OPC process to generate the final mask pattern (or final mask data), wherein the OPC process uses a CLC model calibrated by the measured wafer data. The CLC model incorporated with a mask model calibrated using the measured mask image. By implementing the disclosed method (such as 100 or 200) in various embodiments, some of the advantages described below may present. However, it is understood that different embodiments disclosed herein offer different advantages and that no particular advantage is necessarily required in all embodiments. As one example, by performing the disclosed OPC process using the CLC model, the generated mask pattern includes reduced error according to various embodiments. This approach will provide accurate mask modeling regardless of the mask stack measurement errors. The mask model will be independent from other effects in the CLC model, such as resist diffusion/dissolution. In the existing method, the error of the mask model is absorbed by the final OPC model. By having a more accurate mask model in the present disclosure, there is less chance of over-fitting of the CLC model.

Figure 13:
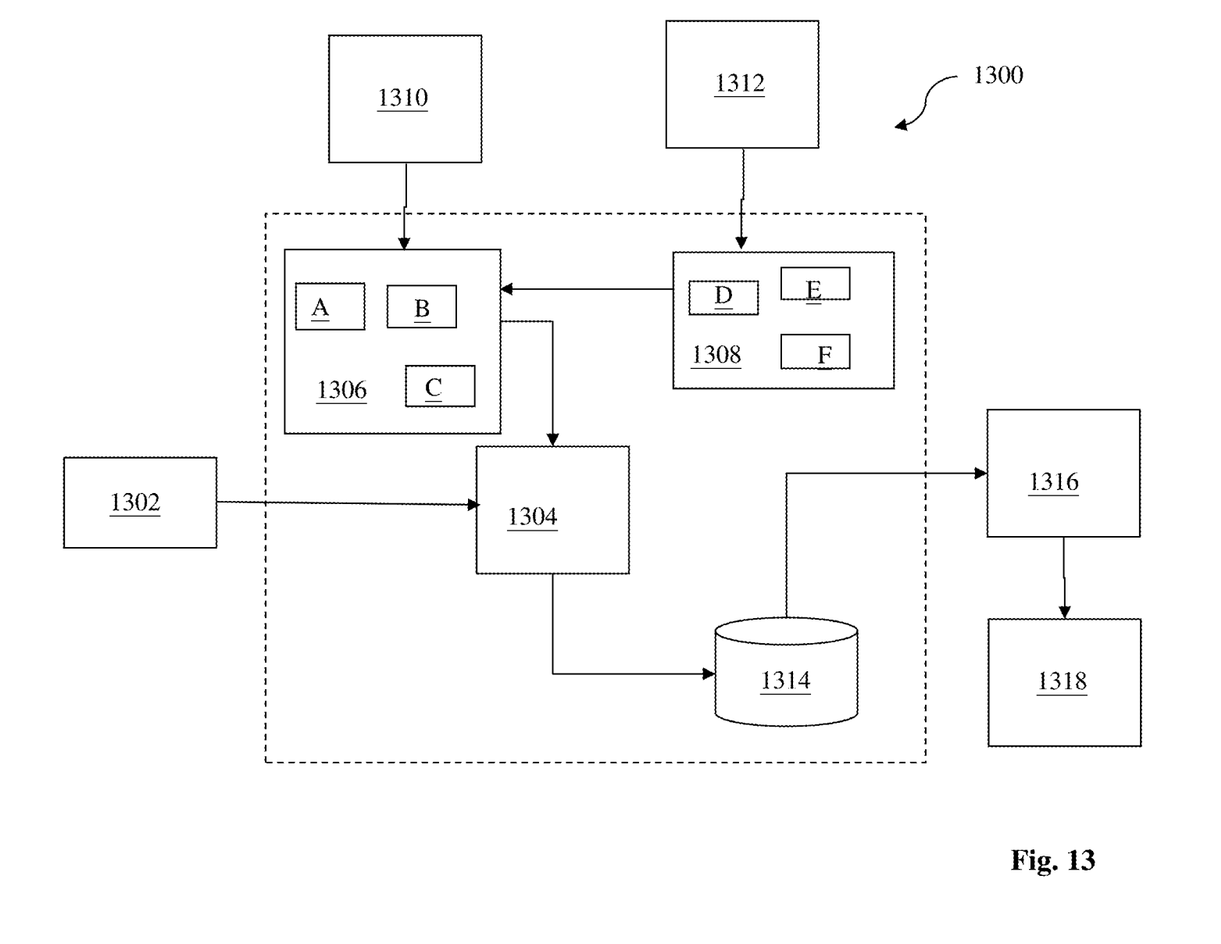
FIG. 13 is a block diagram of a system used in the methods of FIGS. 1 and 2 constructed in accordance with some embodiments.

FIG. 13 illustrates a block diagram of an OPC system 1300 to perform an OPC process using the CLC model calibrated using the measured wafer data and the mask model calibrated using the measured mask image or measured mask data, constructed in accordance with some embodiments. The OPC system 1300 includes both hardware and software integrated to perform various actions to generate a tape-out for e-beam writing. In one embodiment, the OPC system 1300 is designed to perform various operations in the method 100 of FIG. 1 and further some operations in the method 200 of FIG. 2.

The system 1300 receives an IC design layout 1302 (such as IC design layout in FIG. 3), from an IC designer, as an input. The system 1300 sends the IC design layout to the OPC module 1304 for an OPC process using the CLC model from a CLC model module 1306. The CLC model incorporates with the mask model from a mask model module 1308. The CLS model module 1306 is designed to build to a CLC model; collect the wafer data 1310 (measured wafer contour or CDs); and calibrate the CLC model using the wafer data. In other embodiments, The CLC model module 1306 further includes three sub-modules: CLC builder A; calibrator B; and collector C designed to carry on above three functions, respectively. The mask model module 1308 is designed to build a mask model; collect mask data 1312 (measured mask images); and calibrate the mask model using the mask data. In other embodiments, the mask model module 1308 further includes three sub-modules: mask model builder D, calibrator E and collector F designed to carry on above three functions, respectively. The OPC module 1304 is operable to perform an OPC process to the IC design layout and may be operable to perform other functions, such as forming a wafer target, as described in the operation 204. The OPC module 1304 generates a final mask pattern 1314 modified by the OPC process. The final mask pattern 1314 is further sent to a mask making module 1316 to form a mask with the final mask pattern defined thereon.

In some embodiments, the mask making module 1316 includes an electron-beam writer, and may further includes other mask making apparatus, such as an etching tool. The mask making module 1316 forms a patterned layer on the mask according to the final mask pattern or the electron-beam shot map. Thus formed mask is further sent to a wafer making module 1318. The wafer making module 1318 pattern one or more semiconductor wafers using the mask. The wafer making module 1318 includes a lithography exposure tool, such as a EUV scanner. In some embodiments, the wafer making module 1318 may further include an etching tool that transfers the photoresist pattern to an underlying material layer on the semiconductor wafer.

Although various embodiments of the present disclosure are provided above. Other embodiments may be present without departure from the spirit of the present disclosure. For example, the radiation energy for the lithography pattern may be alternatively ion beam. In this case, various corrected doses are ion beam exposure doses. In another example, the system 1300 may be a separate entity or may be distributed in existing entities, such as a design/lab facility or an online system. In the present example, the system 1300 is connected to a network, such as the Internet or an intranet.

The present disclosure provides a method for OPC process using the CLC model calibrated by the measured wafer data and the mask model calibrated using the measured mask data. By implementing the disclosed method (such as 100 or 200) in various embodiments, some of the advantages described below may present. However, it is understood that different embodiments disclosed herein offer different advantages and that no particular advantage is necessarily required in all embodiments. As one example, by performing the disclosed OPC process using the CLC model, the generated mask pattern includes reduced error according to various embodiments. This approach will provide accurate mask modeling regardless of the mask stack measurement errors. The mask model will be independent from other effects in the CLC model, such as resist diffusion/dissolution. In the existing method, the error of the mask model is absorbed by the final OPC model. By having a more accurate mask model in the present disclosure, there is less chance of over-fitting of the CLC model.

Thus, the present disclosure provides an integrated circuit (IC) method in accordance with some embodiments. The method includes building a mask model to simulate a mask image and a compound lithography computational model to simulate a wafer pattern; calibrating the mask model using a measured mask image; calibrating the compound lithography computational model using a measured wafer data and the calibrated mask model; and performing an optical proximity correction (OPC) process to an IC pattern using the calibrated compound computational model, thereby generating a mask pattern for mask fabrication.

The present disclosure provides an integrated circuit (IC) method in accordance with some embodiments. The method includes calibrating a mask model using a measured mask image; calibrating a compound lithography computational model using a measured wafer data and the calibrated mask model; and performing an optical proximity correction (OPC) process to an IC pattern using the calibrated compound computational model, thereby generating a mask pattern for mask fabrication.

The present disclosure provides an integrated circuit (IC) design system in accordance with some embodiments. The IC design system includes a mask data module designed to collect mask imaging data; a wafer data module designed to collect wafer manufacturing data from a wafer making process; a first calibration module designed to calibrate a mask model based on the mask imaging data; a second calibration module designed to calibrate a compound lithography computational model based on the wafer manufacturing data; and an optical proximity correction (OPC) module designed to perform an OPC process using the mask model and the compound lithography computational mode.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) method comprising:
building a mask model to simulate an aerial mask image of a mask, and a compound lithography computational (CLC) model to simulate a wafer pattern;
calibrating the mask model using a measured aerial mask image of the mask;
calibrating the CLC model using measured wafer data and the calibrated mask model; and
performing an optical proximity correction (OPC) process to a mask pattern using the calibrated CLC model, thereby generating a corrected mask pattern for mask fabrication.

2. The IC method of claim 1, wherein the aerial mask image of the mask includes an image of the mask optically projected onto an image stage.

3. The IC method of claim 1, wherein the building the mask model includes building the mask model based at least in part on historic aerial image data.

4. The IC method of claim 1, wherein the building the mask model includes:
defining the mask model from a total intensity from a partially coherent illumination source $I_\alpha(x, mp)$, wherein the $I_\alpha(x, mp)$ includes parameters of the mask model; and
determining the parameters of the mask model using historic manufacturing data.

5. The method of claim 1, wherein the building the mask model includes building the mask model according to the following:

$$I_\alpha(x, y, mp) = \sum_i \left| \sum_\gamma m_\gamma(x, y) \otimes V_{\alpha\gamma,i}(x, y, mp) \right|^2$$

where $I_\alpha(x, y, mp)$ is the diffracted mask image,
$m_\gamma(x, y)$ is a function modified from real mask layout,
$V_{\alpha\gamma, i}(x, y, mp)$ is the kernel, and
mp is a set of mask model parameters.

6. The IC method of claim 1, further comprising obtaining the measured aerial mask image of the mask from an image measurement system (IMS).

7. The IC method of claim 1, wherein the building the CLC model includes building in part from historic manufacturing data from lithography processes and etching processes.

8. The IC method of claim 1, wherein:
the calibrating the mask model includes comparing a first difference between the measured aerial mask image and the simulated aerial mask image and minimizing the first difference by iteratively tuning parameters of the mask model, and
the calibrating the CLC model includes comparing a second difference between a measured critical dimension (CD) and a simulated CD generated with the CLC model and minimizing the second difference by iteratively tuning parameters of the CLC model.

9. The IC method of claim 1, wherein the CLC model includes the calibrated mask model.

10. The IC method of claim 1, wherein the performing the OPC process includes:
modifying the mask pattern;
simulating the mask pattern using the CLC model to generate a wafer contour of the modified mask pattern;
determining a difference between the wafer contour and a wafer target; and
iteratively modifying the mask pattern until the difference is below a predetermined threshold to generate the corrected mask pattern.

11. An integrated circuit (IC) method comprising:
measuring a mask image of a mask optically projected on a wafer with an instrument;
calibrating a mask model using the measured mask image;
calibrating a compound lithography computational (CLC) model using measured wafer data and the calibrated mask model; and
performing an optical proximity correction (OPC) process to a mask pattern using the calibrated CLC model, thereby generating a corrected mask pattern for mask fabrication.

12. The IC method of claim 11, wherein the instrument images a mask pattern similar to a lithography exposure system.

13. The IC method of claim 11, wherein:
the mask model generates a simulated mask image of the mask accounting for at least effects of mask diffraction and imaging projection, and
the calibrating the mask model includes iteratively adjusting parameters of the mask model such that a difference between the measured mask image and the simulated mask image is below a predetermined threshold.

14. The IC method of claim 11, wherein:
the CLC model generates simulated wafer data from the calibrated mask model, accounting for at least mask diffraction, imaging projection, resist reaction with photon and resist development, and
the calibrating the CLC model includes iteratively adjusting parameters of the CLC model such that a difference between the measured wafer data and the simulated wafer data is below a predetermined threshold.

15. The IC method of claim 14, wherein the CLC model further accounts for effects of an etching process.

16. The IC method of claim 11, wherein the OPC process includes iteratively modifying the mask pattern and generating a simulated wafer contour for the modified mask pattern from the calibrated CLC model until a difference between the simulated wafer contour and a wafer target is below a predetermined threshold.

17. The IC method of claim 11, further comprising manufacturing the mask based on the mask pattern.

18. An integrated circuit (IC) design system comprising:
- a mask data module designed to collect mask imaging data including a mask image of a mask optically projected to an image stage;
- a wafer data module designed to collect wafer manufacturing data from a wafer making process;
- a first calibration module designed to calibrate a mask model based on the mask imaging data;
- a second calibration module designed to calibrate a compound lithography computational (CLC) model based on the wafer manufacturing data; and
- an optical proximity correction (OPC) module designed to perform an OPC process using the mask model and the CLC model.

19. The IC design system of claim 18, further comprising a model builder designed to build the mask model and the CLC model.

20. The IC design system of claim 18, wherein the first calibration module and the second calibration module each implement an iterative process to generate parameters for the mask model and the CLC model, respectively.

* * * * *